United States Patent [19]

Shao et al.

[11] Patent Number: 5,130,165
[45] Date of Patent: Jul. 14, 1992

[54] PROCESS FOR PRODUCING A METAL-GLASS GLAZE COMPOSITE PIPE

[75] Inventors: Wengu Shao; Liquan Wang, both of Beijing, China

[73] Assignee: Yasunari Horiuchi, Kumamoto, Japan

[21] Appl. No.: 598,026

[22] Filed: Oct. 16, 1990

[30] Foreign Application Priority Data

Oct. 17, 1989 [CN] China .................. 89107856.8

[51] Int. Cl.$^5$ .............................................. B05D 3/12
[52] U.S. Cl. .................... 427/330; 118/315; 239/79; 427/376.4; 427/419.4; 427/423; 427/424; 427/425
[58] Field of Search .......... 427/34, 193, 419.4, 427/419.6, 330, 422, 423, 425, 424, 233, 234, 236, 239, 376.4, 397.7; 219/121.47; 239/79, 290, 296, 597; 118/318, 315

[56] References Cited

U.S. PATENT DOCUMENTS

| 4,382,811 | 5/1983 | Lüscher et al. | 427/422 |
| 4,490,411 | 12/1984 | Feder | 427/233 |
| 4,740,388 | 4/1988 | Nakashima | 427/193 |
| 4,871,114 | 10/1989 | Kenderi | 239/79 |
| 5,019,429 | 5/1991 | Moskowitz et al. | 427/423 |

FOREIGN PATENT DOCUMENTS

| 553771 | 3/1958 | Canada | 427/425 |
| 154513 | 9/1985 | European Pat. Off. | |
| 3017100 | 11/1981 | Fed. Rep. of Germany | 427/422 |
| 3417229 | 11/1985 | Fed. Rep. of Germany | 239/296 |
| 2490820 | 3/1982 | France | 427/34 |
| 50-25924 | 8/1975 | Japan | 427/330 |
| 62-133062 | 6/1987 | Japan | |

OTHER PUBLICATIONS

Schrewelius, N. G., "A Method of Applying a Heat-Resistant Surface by Flame Spraying," Chem. Abstract No. 44807h (3/1966).
Ingham, H. S. and A. P. Shepard, "Flame Spray Handbook," vol. 2, Metco, Inc. (New York, 1964).

*Primary Examiner*—Shrive Beck
*Assistant Examiner*—Terry J. Owens
*Attorney, Agent, or Firm*—Reed Smith Shaw & McClay

[57] ABSTRACT

A process for producing a metal-glass glaze composite pipe including removing corrosion from a metal pipe, simultaneously rotating and translating the pipe through a protective cover operating under a substantially non-oxidating environment and containing an induction pre-heating device and a pair of spray guns. The pre-heating device heats the pipe to a first predetermined temperature while the first and second spray guns apply first and second layers of hot-sprayed, flame-liquefied powdered glaze material to the pipe. An induction post-heater is provided to ensure the quality of seal effected by the layers of glaze material.

6 Claims, 3 Drawing Sheets

PROCESS FOR PRODUCING A METAL-GLASS GLAZE COMPOSITE PIPE

TECHNICAL FIELD

The present invention relates generally to the field of composite pipes possessing the properties of excellent anticorrosive performance and a long lifetime, and more particularly, to employing a hot-spraying technique for preparing metal-glass glaze composite pipe for use in industrial applications in petroleum, chemical engineering, medical, and dye material applications, or for use in oil transportation, water supply, gas supply, as well as underground or submarine anticorrosive tube usage.

BACKGROUND OF THE INVENTION

At the present time, the main method for preventing tube or pipe corrosion in China makes use of hot bitumen or tar, which method was also the main method used in the major industrialized countries until recently. The lifetime of pipes treated with bitumen generally does not exceed ten years and in regions suffering from heavy corrosion conditions, the lifetime of such pipes does not exceed 5–7 years. There are many drawbacks to using such kinds of anticorrosive coating materials, e.g., the deformation rate limit is small, dripping flow occurs at elevated temperatures which damage the anticorrosive layer, the base produced at cathode protection harms the adhesion of the base painting, and microorganisms can cause erosion or damage thereon. Therefore, the weak points of the piping anticorrosive layer run the risk of being damaged at all times. This not only results in payment of large amounts of maintenance fees, but also results in a sizeable economic loss due to repairing and servicing of the pipings and interruption of the fluid transportation.

In recent years, the epoxy powder spraying method has been widely used for tube anticorrosion in many countries. In West Germany, for example, polyethylene powder coating material is employed for 90% of the anticorrosive applications with respect to gas piping as well as water supply piping. Epoxy powder coating material is widely used in western Europe and the United States. Since 1985, the Chinese Academy of Piping Research has successfully experimented with the epoxy powder spraying method for pipes and has commercialized such a method. Such steel-plastic composite pipes have a longer lifetime than those with the bitumen coating layer due to the raising of the deformation rate limit so that neither serious deformation will take place, nor will dripping cause damage. However, because epoxy powder is an organic material as is bitumen, it is susceptible to the aging problem of the coating layer. Along with the lapse of time, the rise and fall of temperature, the influence of the air humidity, as well as the acid, base, salt and water in the soil, the aging of the coating layer will accelerate. The age limit of both polyethylene and epoxy coating materials will barely exceed 20 years.

EP-0154513 (publication number) relates to glass compositions which are suitable for bonding to alloys, in particular, "Vitallium" (trademark) alloys. Its use is limited to implant tubes for use in surgical operations.

According to JP 60-273448, powdered glass spheres can be carried by a gas having a certain velocity and sprayed onto the surface of a base material, whereby these powder spheres form a molten film and adhere onto the surface of the base metal. The operational temperatures of the process are in the range of 700° C. to 800° C. and the use of the process is limited to only insulating material and fabrics.

The above art relates to glass that is sprayed onto a base material to form a composite material, as opposed to an inorganic material coating for anticorrosive purposes.

Therefore, it is necessary to provide a kind of pipe material which can eliminate the aging drawbacks of the present organic anticorrosive coating layer, to improve the anticorrosive performance of the pipings, and significantly lengthen their operational lifetime.

SUMMARY OF THE INVENTION

Accordingly, it is an object of the present invention to provide a metal-inorganic material composite piping to replace the existing metal-organic material composite pipe. According to the present invention, a metal-glass glaze composite pipe is prepared using a flat nozzle gun as well as a special set of equipment to hot-spray specially prepared glass glaze coating material onto the surface of standard metal piping as a glass glaze coating layer.

Other features and advantages of the invention will be apparent from the following description of the preferred embodiments, and from the claims.

DETAILED DESCRIPTION OF THE PREFERRED EMBODIMENT

As is well known in the art, porcelain enamel is an inorganic material with anticorrosive performance. At the present time, enamel products are all produced by calcination in furnaces, such that very long pipes are difficult to prepare.

The metal-glass glaze pipe or product provided by the method of the present invention is not prepared by calcination in specially dimensioned furnaces, but is instead formed by means of a hot-spraying process. Therefore, the process provided by the present invention can produce very long pipes which are comparable to those with porcelain enamel. Additionally, the equipment used in the present process can be moved directly to the construction site for preparing the pipes.

The present invention provides a composition for the glaze used in hot-spraying, spray guns and the other special equipment system to carry out the method of the present invention, as well as the process for hot-spraying to form the metal-glass glaze composite of the present invention.

It can be shown that $MoO_3$ can significantly improve formability of undeveloped glass, while tungsten and molybdenum also contribute to the chemical stability of glass. Such compounds are not only helpful for the melting of glass, but also have a positive effect on the brightness of the surface of the sprayed products. Together with base material, $MoO_3$ and $WO_3$ can readily form a molten compound molybdate or tungstate which can react to some extent with the metal pipe interface in the course of hot-spraying. For example, when barium molybdate is used as the base glaze of enamel chinaware, the adhesive force of the porcelain glaze onto metal can be improved.

$MoO_3$ and $WO_3$ are also surfactants of glass which can reduce the viscosity of glass and improve the wetting ability of glass onto metal.

Figure 1:
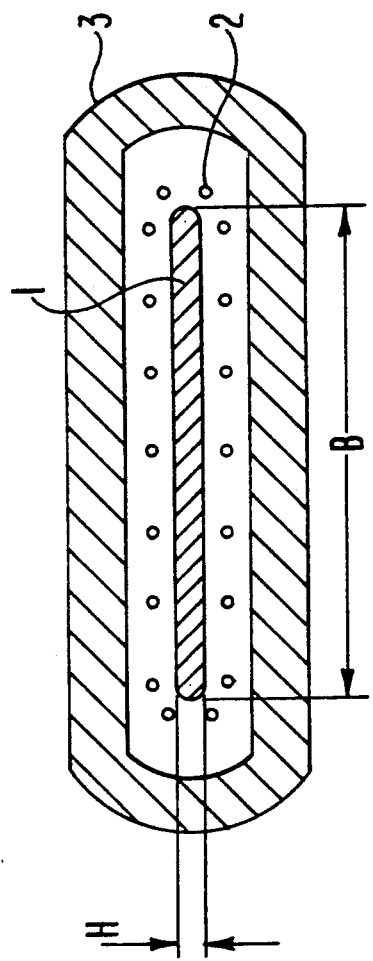
FIG. 1 is a sectional view of the nozzle for the hot-spray gun used to practice the present invention.

The nozzles of the metal power spray guns used in prior processes are of a round shape, while the nozzles of the guns employed in the present invention are flat as shown in FIG. 1. The height H of the nozzle spray orifice (1) is smaller than the width B; the holes surrounding the nozzle spray orifice are the gas orifices (2) which inject a gaseous mixture of ethine (acetylene) and oxygen, which gives rise to flames and cause melting of the starting powdered glaze material. The outermost layer of the nozzle is the radiating fin (3).

Figure 2:
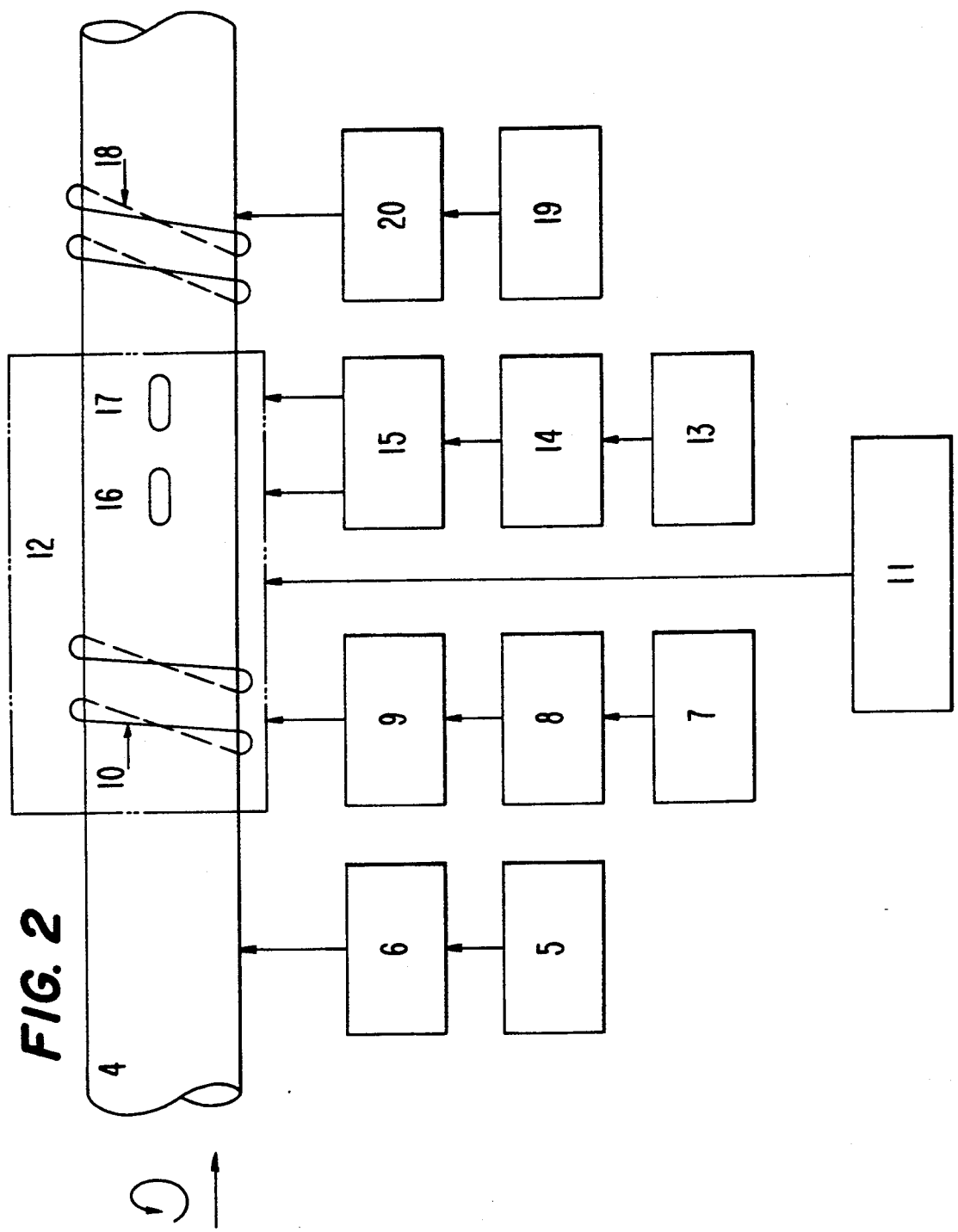
FIG. 2 is a flow chart of a schematic model of the hot-spraying method of the present invention.

The hot-spraying technique of the present invention is shown schematically in FIG. 2. The spraying equipment system is divided into six parts: (I) a pipe transportation system; (II) a pipe-derusting system; (III) a pipe preheating system; (IV) a pipe nitrogen protecting system; (V) a hot-spraying system; and (VI) a heating and sealing system.

The pipe (4) being sprayed during the hot-spraying operation of the present invention undergoes two simultaneous motions: a rotation about the pipe axis, and a movement along the axial direction of the pipe. Before spraying a pipe, it is necessary to use air compressor (5) and sand-blower (6) to remove any rust on the present pipe. A diesel generator (7) is used to supply power to the frequency converter and intermediate frequency generating unit (8). The pipe is preheated by the induction heating coil (10) coiled around the pipe preheating region (9) of a nitrogen protective cover (12). Nitrogen produced by a nitrogen generator (11) is introduced into the nitrogen protective cover (12) such that the preheating region and the glaze spray region on the pipe can be well protected to prevent the pipe from being oxidized at high temperatures. During spraying, a combination of ethine (acetylene) and oxygen are used as a combustion gas (13) which, together with a powdered glaze composition (14), are fed respectively to two spray guns (15). These two guns are disposed in parallel along the axial direction of the pipe to carry out two layers of spray comprising an under-glaze layer (16), and an overglaze layer (17). After the spraying is completed, the pipe enters a high frequency post-heat region (20) to allow the micropores on the glaze-sprayed face of the pipe to be well sealed to ensure the spraying quality. To carry out the final steps in the spray coating operation, the converter, a high frequency generating unit (19) and the high frequency induction heating coil (18) are used to post-heat the pipe (4) at the post-heating region (20).

The above spraying operation is suitable for the spray-coating of the outer face of the pipes The spraying of the outer surfaces of the pipes is accomplished by a spray gun utilized with the pipe rotationally inclining to a certain degree.

The preheating temperature of the pipe is generally in the range of between about 300° C. to about 750° C., and is preferably about 700° C. If intermediate frequency generation unit (8) is used for heating, an ideal temperature field for spray coating can be provided.

Figure 3:
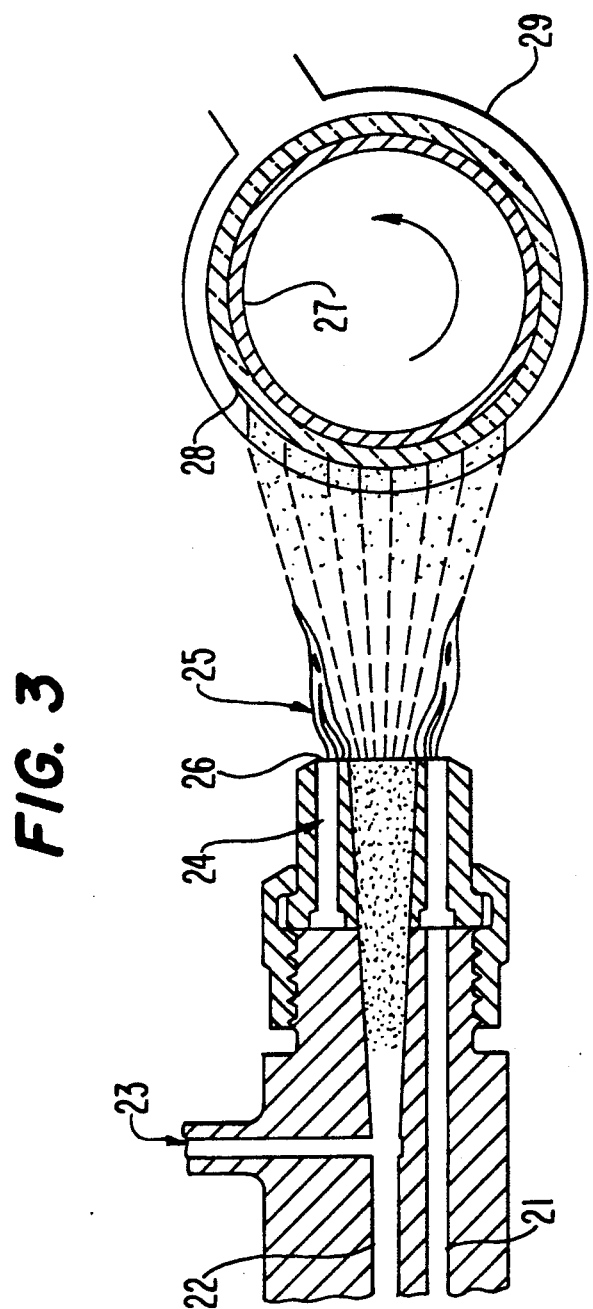
FIG. 3 is a sectional view of the hot-spray operation of the spray gun.

FIG. 3 illustrates the operation of hot-spraying glass glaze onto metal pipe. The flat nozzle spray gun as shown in FIG. 1 is used as the hot-spraying tool. Ethine (acetylene) (21) and oxygen (22), as well as a powdered glaze material (23), examples of which are listed in Table I, are fed into the gun simultaneously. The materials are ignited at gas orifice (24) and the nozzle (26) at temperatures in the range of between about 1,400° C. to about 3,000° C. The powdered glaze material is heated in a flame (25) and melted into liquid drops, which are uniformly injected towards the rotating surface of the metal pipe (27) which is also horizontally moving at the same time. A glass glaze coating layer (28) is formed comprised of an underglaze having a preferable thickness with a range of between about 0.2 mm to about 0.4 mm, and an overglaze having a preferable thickness with a range of between about 0.3 mm to about 0.6 mm.

The thickness of the underglaze on the surface of the metal pipe is generally in the range of between about 0.05 mm to about 2.0 mm, and is preferably in the range of between about 0.2 mm to about 0.4 mm; the thickness of the overglaze is generally in the range of between about 0.05 mm to about 3.0 mm, preferably in the range of about 0.3 mm to 0.6 mm. The total thickness of the two glaze layers is in the range of between about 0.10 mm to about 5.0 mm, and is preferably in the range of between about 0.5 mm to about 1.0 mm.

After spraying of the pipe is completed, the pipe is post-heated by high frequency induction coil (18) at the high frequency heating region, to a temperature which should be maintained in the range of between about 600° C. to about 850° C., and is preferably about 750° C. Such heating can eliminate the micropores on the coating and ensure the quality of the resultant composite pipe.

The test results of the physical and chemical performances of the composite pipe of the present invention are shown in Table 2, which are provided by the Chemistry Department, Qinghua University. It can be seen that the composite pipe of the present invention possesses good anticorrosive performance characteristics such as, for example, fluorion-corrosion resistance, alkali resistance, acid resistance, salt tolerance, and mechanical strength such as, for example, shock-resistance, and thermal shock resistance. Operational temperatures of the composite pipe may reach as high as 300° C., whereas the maximum operational temperature of organic coating layers is between about 60° C. and 100° C. The adhesive performance of the glaze layer of the present composite pipe is also good. For example, the glaze will not rupture or strip after being hit by a steel ball ten times, and although the overglaze will be stripped off after a hammer strike test on the glaze surface, the underglaze remains normal.

While metal pipe has high strength but low anticorrosion ability, and glass has good anticorrosion ability but low strength, these two advantages are well combined by means of the hot-spraying technique of the present invention. The composite pipe possesses the strength of metal and the anticorrosive properties of glass. Such a coating formed by glass glaze will not significantly age for about one hundred years.

The method provided by the present invention can also be used for hot-spraying the coating of various colors and various patterns onto metal substrates to manufacture metal-colored glass glaze composite products used as, for example, building signs, billboards, road signs, and street nameplates.

In order to promote the development of the piping industry and to satisfy the characteristics or demands in different countries, production capabilities have been developed in mobile factories. Also, the various required special equipment is incorporated into mobile tool cars for further production. In this way, the pipe production and the pipe application can be well integrated.

Although the foregoing invention has been described in some detail by way of illustration and example for purposes of clarity of understanding, it will be obvious that certain changes and modifications may be practiced within the scope of the appended claims.

TABLE 1

| | Components | Composition of Hot-spraying glaze material | | | | | | | | |
|---|---|---|---|---|---|---|---|---|---|---|
| | | $Na_2O$ | $Al_2O_3$ | $B_2O_3$ | $SiO_2$ | $Co_2O_3$ | $MnO_2$ | $MoO_3$ | $WO_3$ | $NiO_2$ |
| Under-glaze | Content (% by weight) | 15–30 | 3–10 | 5–25 | 20–45 | — | 0.11 | 10–25 | 1–8 | 1.0 |
| Overglaze | Content (% by weight) | 15–30 | 3–10 | 5–25 | 15–37 | 0.1–5.0 | 0.11 | 15–35 | 1–8 | — |

TABLE 2

Test Results of Physical & Chemical Performance of the Composite Pipe
(Weight loss unit $g/day \cdot m^2$ (* — $g/m^2$))

| Performance | Test Method | Test Results | | Remarks |
|---|---|---|---|---|
| | | appearance change | Weight loss | |
| Operational temperature | Determined by melting method; Operational temperature is about 0–300° C. | | | Operational temperature depends on operational conditions; while without corrosion contaminant, operational temperature may be set in a suitable wider range. |
| Adhesive test | After a steel ball falls from 1 meter high onto the center of the sample, observing by naked eye decortication and combination between the underglaze and the metal. | Adhesion of glaze with metal is quite good. The glaze of the sample does not rupture and strip, after a shock of 10 TIMES. For a hammer strike on the glaze, the overglaze is peeled off but the underglaze remains normal. | | National standard Test method (shock method) |
| Shock resistance | using CHARPY XCJ-40 TYPE SHOCK MACHINE | | | Shock resistance is 4500 g · cm |
| Saline water tolerance | Sample is immersed for 7 days in 5% NaCl aqueous solution at room temperature | Without rust and peeling off. | 0.00 | |
| Saline mist tolerance | Sample is stored in the thermostat with 5% NaCl aqueous solution at 100° C. A 15 minute continuous mist-spray is made every minutes; the test lasts 7 days, 8 hrs a day. | Without rust and peeling off. | | |
| Fluorion resistance | Sample is immersed for 7 days in 5% NaCl aqueous solution | Without rust and peeling off. | 0.55 | |
| Acid resistance | 1. Immersed for 7 days in strong phosphoric acid. | Without rust and peeling off. | 1.24 | |
| | 2. Immersed for 7 days in HCl | Without gloss | 1.50 | |
| Alkali resistance | 1. Sodium carbonate method | Without rust and peeling off. | 1.01 | National standard Test Method |
| | 2. Immersed for 7 days in 5% NaOH | Without rust and peeling off. | 1.82 | |
| Thermal shock resistance | Sample is heated in the electric heater unit up to 200° C. and quenched with 20° C. water; in the case of no damage, the temperature will be increased at 20° C. intervals until visible rupture or peeling off of the sample appears | Glaze layer is peeled off at 540° C. | | ISO 2742 standard Experimental Method |
| | Sample is stored in the thermostat of −30° C. and then immediately put into 100° C. boiling water, repeating above procedures until rupture or peeling off appears. | After repeating the test for 200 times, no rupture, nor peeling off. | | |
| Self-cleaning ability | A drop of refined bean oil falls on the glaze of the sample which is baked for 1 hr at 250° C. and then the self-cleaning effect is observed. | Excellent self-cleaning ability | | ISO 2746 standard Experimental Method |

TABLE 2-continued

Test Results of Physical & Chemical Performance of the Composite Pipe
(Weight loss unit g/day · m² (* —g/m²))

| Performance | Test Method | Test Results | | Remarks |
| --- | --- | --- | --- | --- |
| | | appearance change | Weight loss | |
| Defect determination | Determined by international high pressure | Defect concentration 3 gas pocket/10 cm² | | ISO DIS 8291 Experimental method |

We claim:

1. A process for producing a metal-glass glaze composite pipe, comprising the steps of:
   (a) removing corrosion from the exterior of a metal pipe;
   (b) simultaneously rotating said pipe and translating said pipe through a protective cover containing in the direction of translation a preheating region and a glaze spraying region, said glaze spraying region including a plurality of spray guns disposed substantially side-by-side along the direction of translation of said pipe;
   (c) preheating said pipe at said preheating region by induction heating;
   (d) introducing a substantially inert gas into said protective cover to thereby produce a substantially non-oxidating environment therein;
   (e) providing powdered glass glaze material to said plurality of spray guns;
   (f) melting and liquefying said glaze material through operation of said spray guns;
   (g) spraying an underglaze of said liquefied glaze material onto the exterior of said pipe via one of said spray guns;
   (i) spraying an overglaze of said liquefied glaze material onto the exterior of said pipe via another of said spray guns; and
   (j) post-heating said pipe at a post-heating region by induction heating.

2. The process of claim 1, wherein the temperature of said pipe in said preheating region is in the range of between about 300° C. and about 750° C., the temperature of said liquefied glaze material is in the range of between about 1,400° C. and about 3,000° C., and the temperature of said pipe in said post-heating region is in the range of between about 600° C. and about 800° C.

3. The process of claim 1 wherein in step (c) said induction heating is intermediate frequency induction heating and in step (j) said induction heating is high frequency induction heating.

4. A process for producing a metal-glass glaze composite pipe, comprising the steps of;
   (a) removing rust from the exterior of a pipe with an air compressor and said blower;
   (b) preheating said pipe with an induction heating coil operating as a preheating region for said pipe, wherein power for said preheating is supplied by a frequency converter and a diesel generator;
   (c) generating nitrogen via a nitrogen generator;
   (d) introducing said nitrogen into a nitrogen protective cover containing said preheating region and a glaze spraying region whereby said pipe is protected by said nitrogen form oxidation;
   (e) providing a combustible gas comprising ethine and oxygen and powdered glass glaze material to two spray guns disposed in parallel along the axial direction of said pipe, whereby, during spraying, combustion of said combustible gas produces a spraying flame which melts said glaze material such that said glaze material is applied to said pipe in a liquefied condition;
   (f) spraying an underglaze on the exterior of said pipe via one of said spray guns;
   (g) spraying an overglaze on the exterior of said pipe via the other of said spray guns; and
   (h) heating said glazed pipe in a post-heating region by a converter and a high frequency induction heating coil, wherein during steps (a) through (h) said pipe simultaneously moves about its own axis and in the axial direction.

5. The process of claim 4, wherein said spray guns comprise substantially flat spray nozzles including spray orifices having a lesser height than width.

6. The process of claim 4, wherein the temperature of said pipe in said preheating region is in the range of between about 300° C. and about 750° C., the temperature of said spraying flame and the liquefied glaze material is in the range of between about 1,400° C. and about 3,000° C., and the temperature of said pipe in said post-heating region is in the range of between about 600° C. and about 850° C.

* * * * *